United States Patent

[11] 3,587,645

[72] Inventor Enrique Carbo Mengual
Santiago Rusinal 10, Barcelona, Spain
[21] Appl. No. 859,370
[22] Filed Sept. 19, 1969
[45] Patented June 28, 1971

[54] VALVE FOR SERVO-STEERING DEVICES
3 Claims, 2 Drawing Figs.
[52] U.S. Cl. .................................................. 137/625.21
[51] Int. Cl. ................................................... F16k 11/02
[50] Field of Search ............................................ 91/374-
—378; 137/625.21—24

[56] References Cited
UNITED STATES PATENTS
3,145,626 8/1964 Vickers et al. ............... 137/625.24X
3,227,178 1/1966 Elwell ............................ 137/625.21
3,296,939 1/1967 Eddy .............................. 137/625.24X
3,296,940 1/1967 Eddy et al. .................... 137/625.24X
3,404,704 10/1968 Adams ........................... 137/625.22

Primary Examiner—Henry T. Klinksiek
Attorney—Sughrue, Rothwell, Mion, Zinn and MacPeak ABSTRACT: A hydraulic valve for a servo steering device where the hydraulic fluid flows through a continuous longitudinal slot in the steering shaft. The relative position of an enveloping sleeve will control the appropriate flow of hydraulic fluid to effectuate the rotary movement. A spindle connected to the steering shaft includes internal teeth that engage in the same cavity formed by the continuous slots located in the steering shaft. This particular hydraulic conduit system eliminates the costly machining associated with other hydraulic systems.

VALVE FOR SERVO-STEERING DEVICES

The present invention relates to improvements in valves for servo steering devices, with a view to simplifying the members forming part of the mechanism which controls the hydraulic circulation in the active phases of the turning of the steering to one side or the other, since the above members have certain costly machined, precision areas, to be precise, those relating to the steering shaft.

According to the invention, the circulation of the servo steering mechanism activating fluids, in both opposed directions, through the enveloping sleeve of the steering shaft connected to the spindle, takes place through some continuous slots cut into the shaft. According to the relative positions of the sleeve and shaft, as the latter turns, certain communications of the mechanism are set up to regulate the hydraulic circulation, in such a way that the internal teeth of the spindle body engage in the same cavity resulting from the aforementioned continuous slots for its rotary drive.

Optionally the sliding sleeve may be fitted with a freely adjustable centering device which comprises an eccentric pivot connected to a cylindrical body which is fixed to the base of the spindle, of a less hard nature, by means of peripheral knurling which is pressed into and embedded in the base.

Optionally also, the distance ratio between the guide rings and the diameter of the rotor sleeve is optimal with the eccentric pivot situated between both rings.

Other aims and features of the invention will be further described in detail in the following specification with reference to the accompanying drawings, in which.

Figure 1:
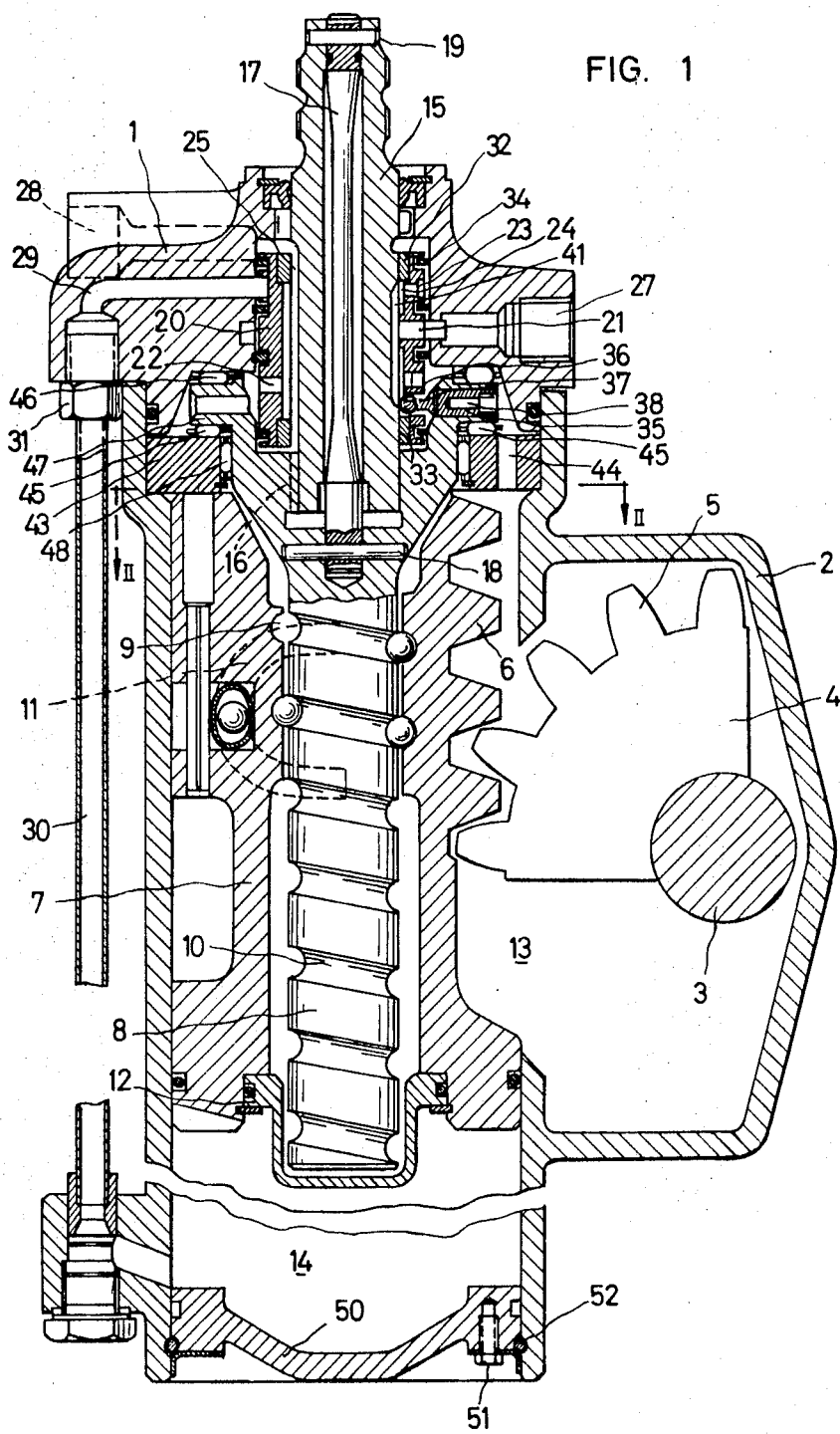
FIG. 1 is a longitudinal section of a servo steering device fitted with the members according to the invention.
Figure 2:
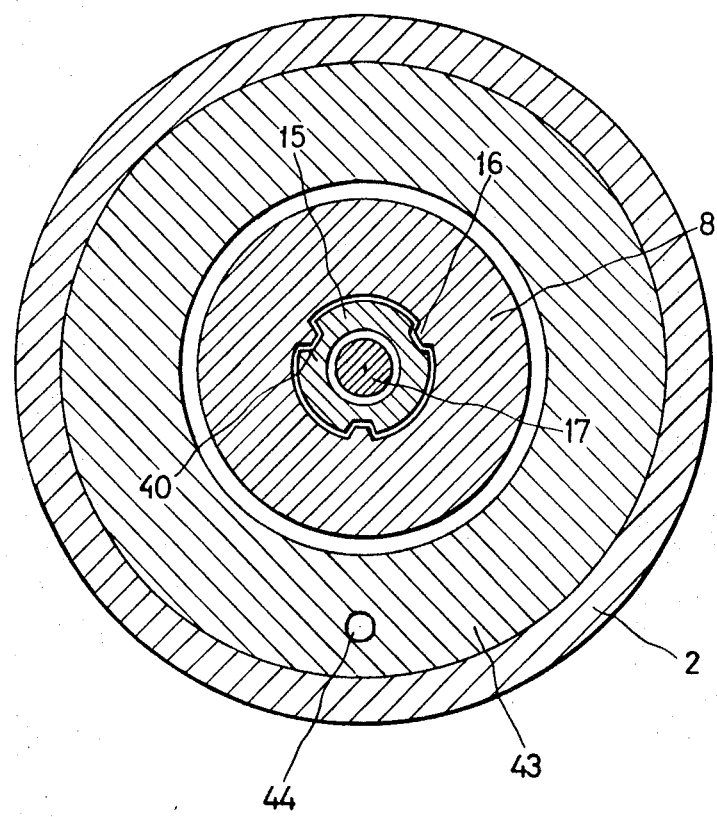
FIG. 2 is a cross section of the mechanism of the previous FIG., taken across the line II-II.

The servo steering mechanism is lodged in a housing 1 connected to the casing 2 which contains the steering bar 3 fitted with a toothed segment 4, the teeth 5 of which engage with further teeth 6 of a slide 7. In turn, this slide 7 cooperates with a spindle 8 through balls 9 which run in a helical slot 10 cut into the spindle itself, with a return passage through some internal conduits 11.

The slide 7 is fitted with a front shield 12 and separates chambers 13 and 14 in which the fluid exerts servo steering operative pressure effects.

The spindle 8 is related to the steering shaft 15, which shaft is controlled by the manually operated steering wheel holding steering column, by way of axial teeth 16. Also, the shaft 8 is in fixed cooperation with a torsion bar 17, concentrically housed in the shaft 15, by way of a pin 18.

The torsion bar 17 is also fixed to the shaft 15 by way of a further pin 19 housed at the opposite end of the connection of the torsion bar 17 to the spindle 8.

The servo steering mechanism control valve comprises essentially a sleeve 20 which surrounds the shaft 15, having bores 21, 22 and a peripheral groove 23, and slots 24 and 25. These bores, grooves and slots establish sporadic communication with inlet and outlet ports 27 and 28 respectively, as well as with a passage 29 which communicates with the chamber 14 through a tubular member 30 mounted between the housing 1 and casing 2 by way of adjusting nuts 31.

The sleeve 20 has guide rings 32 and 33, sealing rings 34 and a centering device. This latter device comprises a member 35 with an offset pivot 36, which may be positionally adjusted by way of knurling 37 which enables this member 35 to be embedded under pressure in the base of the spindle which is of a softer nature; for possible removal of the member 35, it is equipped with a threaded orifice 38 allowing for the introduction of a threaded pin for extraction purposes.

The teeth 16 of the spindle 8 penetrate into the slots 25 of the shaft 15; further axial slots 41 cooperate with the slots and bores of the sleeve 20. The slots 25 of the shaft 15 comprise the essence of the invention, since they are characterized by being continuous, that is, they are developed all along the zone of facing between the shaft and the sleeve 20 and with the internal driving teeth 16 of the spindle 8.

The advantage that the continuous slot 25 indubitably offers proceeds from its ease of machining, contrary to what happens in similar mechanisms in which the same slots are broken down into other smaller ones which are difficult and time consuming to work. The continuous nature of the slots 25 is feasible because of the uniformity of pressures shown by the fluid in the diverse areas communicated by the same slots. The cross section 40 of the slots 25 is optimal for their hydraulic and mechanical function.

The mechanism is completed by a ring 43 with bore 44 and bearings and diverse accessories. These bearings are the following: two axial bearings 45 and 46 situated at both sides of a peripheral flange 47 of the base of the spindle 8 and a further radial bearing 48 situated around the same base. The casing 2 has a rear cover 50 held in place by screws 51 and equipped with a toric joint 52.

The servo steering mechanism operates as follows. In the stable position which the torsion bar 17 tends to communicate to the mechanism, the oil enters through port 27 and through the bore 21 reaches slot 41 of shaft 15 from where it can find its way out direct to port 28.

When an attempt is made to turn the steering, the steering efforts is momentarily contained by the torsion bar 17 and when the opposition of the latter is overcome, the steering mechanism starts to work to develop the convenient turn; the limit of this turn is controlled by the position in which slots 25 of the shaft run up against the teeth 16 of the spindle.

Thus, when the shaft 15 turns, the slots 41 of said shaft are displaced with respect to those of the sleeve 20, in such a way that the oil finds a way through the passage 29 and tubular member 30 towards the chamber 14 where it exerts a pressure which causes movement of the slide 7. At the same time, the oil held without pressure in the other chamber 13 is driven out through a bore 44 towards the outlet.

The contrary direction of turn for the steering is obtained in the reverse way.

I claim:

1. A hydraulic valve for servo steering devices comprising a steering shaft having at least one continuous longitudinal slot capable of transmitting hydraulic fluid; a spindle having internal teeth operatively connected to the steering shaft, at least one internal tooth engaging one continuous slot for rotary operation; and an enveloping sleeve that, according to its relative position to the steering shaft, is capable of regulating the flow of hydraulic fluid, whereby the continuous slot in the shaft is capable of transmitting hydraulic fluid regardless of the relative rotation of the enveloping sleeve.

2. A hydraulic valve for servo steering as in claim 1 further including a freely adjustable centering device having an eccentric pivot connected to a cylindrical body, the cylindrical body being of a harder material than the spindle and embedded in the spindle.

3. A hydraulic valve for servo steering as in claim 2 further including two guide rings operatively connected to the enveloping sleeve and positioned on either side of the centering device.